Oct. 1, 1935.  W. DÄLLENBACH  2,015,885
METHOD OF PRODUCING A SOURCE OF LIGHT
Filed April 17, 1933
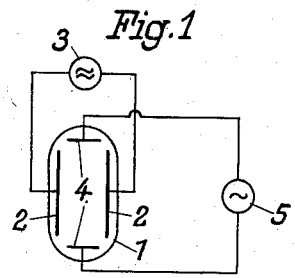
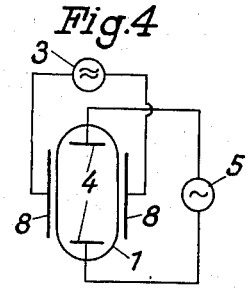
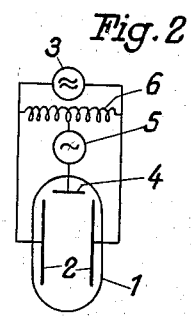
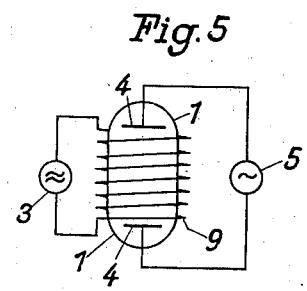
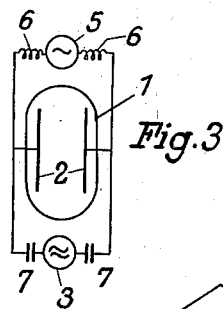
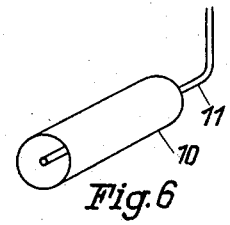
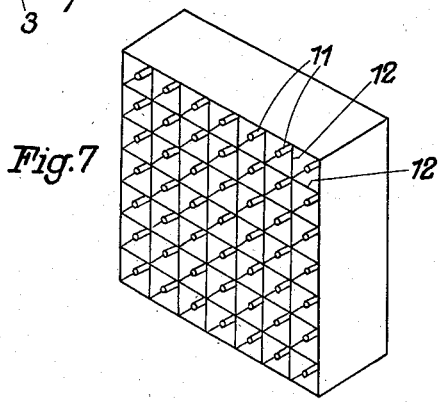
Inventor:
W. Dällenbach
By: Marks & Clerk
Attys.

Patented Oct. 1, 1935

2,015,885

UNITED STATES PATENT OFFICE 2,015,885

METHOD OF PRODUCING A SOURCE OF LIGHT

Walter Dällenbach, Berlin-Charlottenburg, Germany, assignor to N. V. Machinerieen-en Apparaten Fabrieken "Meaf", Utrecht, Netherlands Application April 17, 1933, Serial No. 666,618
In Germany April 22, 1932

8 Claims. (Cl. 176—124)

This invention relates to a method of producing a source of light.

If an evacuated hollow space containing rarefied gas or vapor is placed in a high frequency field, it will be found that a luminous discharge takes place inside the gas beyond a certain voltage. The voltage required for maintaining the high frequency gas discharge is, within a certain range of frequency, the lower the higher the frequency is chosen. Thorough researches have shown that particularly within the range of $10^6$ to $10^8$ Hertz a considerable drop in burning voltage will take place, whereas at frequencies exceeding $10^8$ a further drop is not noticeable, at least not to such an extent, but the burning voltage is per se quite low.

Such a gas discharge may advantageously be used as source of light. The high frequency gas discharge constitutes a uniform and uninterrupted radiation which is not only highly intensive but also free from fluctuations as caused, for example, by alternating current heating point sources of light.

A special advantage of the invention is that the source of light, if the regulation described below is dispensed with, may consist of a plain glass tube which is evacuated and into which electrodes need not be introduced, since the high frequency field can be produced by a coil or by means of electrodes located outside the vessel. As no foreign bodies need be introduced into the glass tube, the production of such an illuminant is extraordinarily simplified. It is advisable at times to work within the range in which a considerable drop in potential will take place at increase of frequency, and, on the other hand, it may be desirable to choose the frequency so that from the very start a very low burning voltage prevails which will not be materially altered at any increase of frequency.

The intensity of radiation or emission can be regulated in a very simple manner. If two electrodes acting as carriers for an auxiliary voltage are introduced into the vacuum vessel being under high frequency influence, electrons may be taken from the high frequency field. For example, the two electrodes are connected, respectively, with the positive or negative pole of a direct voltage, and it will be found that the voltage required for maintaining the high frequency discharge must be the higher the more electrons are withdrawn from the high frequency field by the auxiliary discharge. At constancy of voltage, the light intensity of the high frequency gas discharge will be reduced to the extent electrons are withdrawn by the auxiliary discharge.

These phenomena are probably due to the fact that the high frequency employed causes oscillations of the electrons in the gas space, which in this way attain a constantly increasing kinetic energy until they are capable of ionizing neutral gas or vapor particles on coming in contact with them. Thus a large number of electrons will be produced which attain still greater energy values by the high frequency field, and this process will be repeated until the formation of new electrons by high frequency will counterbalance the number of electrons caught on the walls of the vessel or on the high frequency electrodes. If the two auxiliary electrodes are then connected with direct voltage, quite a number of electrons will be withdrawn thereby from the gas discharge, so that the density of free electrons participating in oscillations in the high frequency field will be reduced, and this decrease in density will be the greater the more electrons are withdrawn owing to the auxiliary direct current discharge. This indicates a possibility for controlling the light intensity of the high frequency discharge by means of the auxiliary direct current discharge.

Since the control of light intensity in the manner indicated is strictly an electronic process, control is effected practically inertialess, and the modulation of light intensity follows therefore closely the variation of the auxiliary voltage.

As stated before, when using control it is possible to dispose at least one of the two high frequency electrodes outside the gas discharge vessel by providing, at the high frequencies concerned, for the capacitive or inductive coupling of the electrodes to the total discharge inside the vacuum vessel. For example, arrangements may be such that the gas discharge takes place between two plates of a condenser, which are exposed to the atmosphere, or within the field space of a high frequency coil.

The medium within which the gas discharge is to be effected may be a rarefied gas or vapor atmosphere, particularly a metallic vapor, such as mercury vapor, or an inert gas, or a mixture of inert gases with or without metallic vapors.

It was considered necessary higherto to arrange the control electrodes for supplying auxiliary voltage separately from those electrodes intended for supplying high frequency, though it is quite possible to use at least one of the high frequency electrodes as electrode for supplying control voltage, or both high frequency electrodes, if disposed within the gas discharge vessel, may serve as control voltage electrodes. All that is required is to provide for the supply of high frequency on the one hand and that of the modulating frequency in the outer circuits in such a way that the high frequency cannot extend beyond the transmitting circuit of the modulating frequency, and vice versa the latter cannot extend beyond the transmitting circuit of the former. For example choke coils may be disposed in the transmitting circuit of the modulating frequency for shutting off the frequency while capacities may be provided in the transmitting circuit of the high frequency for blocking the passage of the modulating frequency.

The invention is illustrated in the accompanying drawing, in which Figures 1 to 7 explain the method and the control, though the latter may be avoided.

In Fig. 1, 1 is the envelope of the vacuum vessel. 2 are the two electrodes for supplying high frequency. 3 is the high frequency source and 4 are the two electrodes for supplying control voltage coming from the source 5. In this example, the high frequency electrodes are inside the vacuum vessel and the two control voltage electrodes are separately arranged.

In Fig. 2, 1 is the wall of the vacuum vessel, 2 are the high frequency electrodes fed by the source 3, but instead of two auxiliary electrodes only one control voltage electrode 4 is provided whose counter electrode are the two high frequency electrodes. The source of control voltage 5 is here connected with the star point of a choking coil 6 disposed parallel to the high frequency source 3. The source 5 of control voltage has a frequency which is lower by at least an order of magnitude than the high frequency of the source 3. The order of magnitude implies a decimal point or position. The inductance of the coil 6 is chosen so that the high frequency cannot to any extent flow over it and is thus forced to actuate gas discharge between the two electrodes 2. The low frequency supplied by the source 5 is, however, capable of passing the inductance of the coil 6 and to influence total discharge in such a way that, for example, an increasing number of electrons will travel from the gas space to the positive electrode 4 and thereby decrease electronic density and, as a result thereof, the emitted light intensity of the gas discharge.

In Fig. 3, 1 indicates the wall of the vacuum vessel and 2, the two high frequency electrodes which, in this case, simultaneously take up the modulating voltage. The high frequency source 3 is connected with the high frequency electrodes 2 by the capacities 7 while the source 5 of the control voltage is connected with the electrodes 2 by the choking coils 6. The high frequency will pass the capacities 7 without essential drops in potential, but is prevented by the coil 6 to pass over the source 5. Inversely, the source 5 of the control voltage is in a position of supplying energy by means of the coil 6 but unable to cross the capacities 7. In this manner it becomes possible of employing the two electrodes 2 for maintaining the high frequency as well as for supplying the auxiliary discharge superposed on the high frequency discharge for modulating the light intensity.

Figs. 4 and 5 exemplify arrangements according to which the high frequency electrodes are located outside the vacuum vessel 1. In the arrangement shown in Fig. 4 the plates of a condenser, which are exposed to the atmosphere, bear the numeral 8 and conduct capacitively, i. e., by means of the electric field, the high frequency energy through the glass to the gas discharge. The other data of the connection correspond to those of the arrangements already explained. In the arrangement shown in Fig. 5 the condenser 8 is replaced by a high frequency coil 9 into the field space of which the discharge tube is inserted.

The electrodes for supplying high as well as modulating frequency may be constructed in various ways, a particularly simple and suitable construction being shown in Fig. 6, comprising two electrodes, namely a cylinder 10 and a wire-like electrode 11 disposed in the axis of the cylinder. Both electrodes 10 and 11 may, according to Fig. 3, serve for supplying both high and modulating frequency and be enclosed in a suitable glass vessel. Owing to the high frequency, in the annular space between the members 10 and 11 a highly luminous gas discharge will be effected which, in axial direction, will appear as a source of light having a small extension yet great surface brightness.

Luminous elements produced according to the method indicated may be united to form larger surfaces by connecting them like cells. An arrangement of this type is shown in Fig. 7, which is of special interest for television purposes. A large number of sheet metal strips 12 are interconnected so as to produce a chess-board-like arrangement of cells in the axis of each of which a further electrode 11 is provided, similar to the arrangement shown in Fig. 6. If high frequency is applied to the electrically interconnected strips 12 and rods 11, a square uniformly lighted over its entire surface will be produced. If, in a similar way as in Fig. 3, each cell is provided with an individual emission voltage between the member 11 and the cell wall 12, it is apparently possible, by suitable selection of the modulating voltage, to impart to each cell a special light intensity and thus to produce a reflection of pictures variable as to time, as is desirable for the purposes of picture transmission and television. Further uses for both single and combined sources of light include photo-telegraphy and photo-telephony.

I claim:—

1. In a tube adapted for the production of a controlled emission of light of preferably great intensity, a small amount of gases or vapors, means for producing a high frequency field of such a high voltage that a luminous gas discharge is produced, and an auxiliary circuit for controlling the intensity of light, and means for supplying to the said auxiliary circuit an alternating current, the frequency of the alternating current being lower by at least an order of magnitude than the first named high frequency and the alternating current being adapted to withdraw electrons from the discharge path, the high frequency being above that range of frequency wherein the burning voltage begins to drop considerably with a slight increase of the frequency.

2. In a tube adapted for the production of a controlled emission of light of preferably great intensity, a small amount of gases or vapors, means for producing a high frequency field of such a high voltage that a luminous gas discharge is produced, and an auxiliary circuit for controlling the intensity of light, and means for supplying to the said auxiliary circuit an alternating current, the frequency of the alternating current being lower by at least an order of magnitude than the first named high frequency and the alternating current being adapted to withdraw electrons from the discharge path, the high frequency being above that range of frequency wherein the burning voltage begins to drop considerably with a slight increase of the frequency, the high frequency and the control circuit being each connected to two electrodes within the tube.

3. In a tube adapted for the production of a controlled emission of light of preferably great intensity, a small amount of gases or vapors, means for producing a high frequency field of such a high voltage that a luminous gas discharge is produced, and an auxiliary circuit for controlling the intensity of light, and means for supplying to the said auxiliary circuit an alternating current, the frequency of the alternating current being lower by at least an order of magnitude than the first named high frequency and the alternating current being adapted to withdraw electrons from the discharge path, the high frequency being above that range of frequency wherein the burning voltage begins to drop considerably with a slight increase of the frequency, electrodes, the high frequency and control circuit being each connected with two of said electrodes, the high frequency electrodes being arranged outside of said tube, the other electrodes being arranged inside of said tube.

4. In a tube adapted for the production of a controlled emission of light of preferably great intensity, a small amount of gases or vapors, means for producing a high frequency field of such a high voltage that a luminous gas discharge is produced, and an auxiliary circuit for controlling the intensity of light, and means for supplying to the said auxiliary circuit an alternating current, the frequency of the alternating current being lower by at least an order of magnitude than the first named high frequency and the alternating current being adapted to withdraw electrons from the discharge path, the high frequency being above that range of frequency wherein the burning voltage begins to drop considerably with a slight increase of the frequency, the high frequency field being produced by a high frequency coil in the field space of which the tube is located, electrodes, the auxiliary circuit being connected with said electrodes and said electrodes being arranged within the tube.

5. In a tube adapted for the production of a controlled emission of light of preferably great intensity, a small amount of gases or vapors, means for producing a high frequency field of such a high voltage that a luminous gas discharge is produced, and an auxiliary circuit for controlling the intensity of light, and means for supplying to the said auxiliary circuit an alternating current, the frequency of the alternating current being lower by at least an order of magnitude than the first named high frequency and the alternating current being adapted to withdraw electrons from the discharge path, the high frequency being above that range of frequency wherein the burning voltage begins to drop considerably with a slight increase of the frequency, electrodes, the high frequency voltage being connected to two of said electrodes located within the tube and the control circuit being connected by one pole of a third electrode and by the other pole to the two high frequency electrodes, and choking devices for preventing short circuiting of the high frequency.

6. In a tube adapted for the production of a controlled emission of light of preferably great intensity, a small amount of gases or vapors, means for producing a high frequency field of such a high voltage that a luminous gas discharge is produced, and an auxiliary circuit for controlling the intensity of light, and means for supplying to the said auxiliary circuit an alternating current, the frequency of the alternating current being lower by at least an order of magnitude than the first named high frequency and the alternating current being adapted to withdraw electrons from the discharge path, the high frequency being above that range of frequency wherein the burning voltage begins to drop considerably with a slight increase of the frequency, two electrodes within said tube connected with the high frequency and the control circuit.

7. In a tube adapted for the production of a controlled emission of light of preferably great intensity, a small amount of gases or vapors, means for producing a high frequency field of such a high voltage that a luminous gas discharge is produced, and an auxiliary circuit for controlling the intensity of light, and means for supplying to the said auxiliary circuit an alternating current, the frequency of the alternating current being lower by at least an order of magnitude than the first named high frequency and the alternating current being adapted to withdraw electrons from the discharge path, the high frequency being above that range of frequency wherein the burning voltage begins to drop considerably with a slight increase of the frequency, two electrodes in said tube supplied by the high frequency and the control circuit, one electrode being constituted by a pin and the other electrode by a mantle surrounding said pin.

8. A tube as claimed in claim 7 characterized by the provision of a plurality of pins and mantles forming cells, and means for modulating the auxiliary field of each cell.

WALTER DÄLLENBACH.